(12) United States Patent
Maziers

(10) Patent No.: US 7,514,130 B2
(45) Date of Patent: Apr. 7, 2009

(54) HIGH ESCR GLOSSY PLASTIC CONTAINERS

(75) Inventor: Eric Maziers, Seneffe (BE)

(73) Assignee: Fina Technology, Inc., Houston, TX (US)

( * ) Notice: Subject to any disclaimer, the term of this patent is extended or adjusted under 35 U.S.C. 154(b) by 455 days.

(21) Appl. No.: 10/491,697

(22) PCT Filed: Sep. 26, 2002

(86) PCT No.: PCT/EP02/11054

§ 371 (c)(1),
(2), (4) Date: Nov. 10, 2005

(87) PCT Pub. No.: WO03/031175

PCT Pub. Date: Apr. 17, 2003

(65) Prior Publication Data

US 2006/0051538 A1 Mar. 9, 2006

(30) Foreign Application Priority Data

Oct. 2, 2001 (EP) .................. 01203726

(51) Int. Cl.
*B32B 27/08* (2006.01)

(52) U.S. Cl. .................. 428/35.7; 428/34.1; 428/34.7; 428/36.91

(58) Field of Classification Search ........... 428/34.1, 428/34.4, 34.6, 34.7, 35.7, 36.4, 36.6, 36.9, 428/36.91, 500, 515, 516, 523
See application file for complete search history.

(56) References Cited

U.S. PATENT DOCUMENTS

| 4,567,069 A | 1/1986 | Jabarin |
| 4,665,263 A | 5/1987 | Smith et al. |
| 5,310,834 A | 5/1994 | Katzen et al. |
| 5,486,584 A | 1/1996 | Badley et al. |
| 5,719,241 A | 2/1998 | Razavi et al. |
| 5,882,750 A | 3/1999 | Mink et al. |
| 5,972,443 A | 10/1999 | Breck et al. |
| 6,063,462 A | 5/2000 | Tsukamoto et al. |
| 6,153,716 A | 11/2000 | Welch et al. |
| 6,223,945 B1 | 5/2001 | Giblin et al. |
| 6,380,311 B1 | 4/2002 | Razavi et al. |
| 6,416,833 B1 | 7/2002 | Climenhage et al. |
| 6,846,551 B2 | 1/2005 | Genske et al. |
| 7,195,806 B2 * | 3/2007 | DeKunder et al. ......... 428/35.7 |
| 2001/0048988 A1 | 12/2001 | Forte et al. |
| 2004/0121098 A1 | 6/2004 | Maziers |

FOREIGN PATENT DOCUMENTS

| EP | 0291824 A2 | 11/1988 |
| EP | 0580930 A1 | 2/1994 |
| EP | 0585512 A1 | 3/1994 |
| EP | 1273436 A1 | 1/2003 |
| WO | WO 96/35729 A1 | 11/1996 |
| WO | WO 97/06951 A1 | 2/1997 |
| WO | WO 98/32601 A2 | 7/1998 |

* cited by examiner

*Primary Examiner*—Rena L Dye
*Assistant Examiner*—Walter B Aughenbaugh
(74) *Attorney, Agent, or Firm*—Tenlev R. Krueger

(57) ABSTRACT

Plastic containers including two or more layers wherein the external or the internal layer formed of of a metallocene-produced medium density polyethylene resin, said plastic container respectively an external or internal gloss of at least 40 and an environmental stress crack resistance, as measured by the time to rupture of at least 30 days.

14 Claims, No Drawings

HIGH ESCR GLOSSY PLASTIC CONTAINERS

This invention is related to polyethylene plastic containers having a very high environmental stress crack resistance, easy processing and a high gloss.

Several methods have been sought to produce high gloss plastic containers presenting good processability and good mechanical properties but all the blends and techniques used so far present various disadvantages.

High gloss high density polyethylene (HDPE) has been used: it is characterised by a very narrow molecular weight distribution that is typically inferior to 8. The molecular weight distribution can be completely defined by means of a curve obtained by gel permeation chromatography. Generally, the molecular weight distribution (MWD) is more simply defined by a parameter, known as the dispersion index D, which is the ratio between the average molecular weight by weight (Mw) and the average molecular weight by number (Mn). The dispersion index constitutes a measure of the width of the molecular weight distribution. It is known that a resin of narrow molecular weight distribution will produce plastic containers of very high gloss but simultaneously, that such resin will be very difficult to process and will be characterised by very poor mechanical properties. It has also been observed that said resins have poor mechanical properties, particularly, a very low environmental stress crack resistance (Modern Plastic International, August 1993, p. 45).

The coextrusion of high density polyethylene (HDPE) with a thin external layer of polyamide has been used to produce bottles of very high gloss but that method suffers the major drawback of necessitating an adhesive layer between the HDPE and the polyamide layers.

The coextrusion of high density polyethylene and an external layer of low density polyethylene leads to bottles with a fair gloss. These bottles however have an unpleasant greasy touch and offer a very poor resistance to scratching.

Metallocene-catalysed polyolefins have been used in transparent multilayer films suitable for packaging, for example in EP-A-756,931, WO-98-32601, WO-99-10430, WO-95-21743, WO-97-02294. None of these prior art documents has addressed the problem of this invention: the production of plastic container having a glossy outer surface.

Prior art document WO-97/06951 discloses films having one or more layers wherein at least one layer has a percent haze of less than 17.8 and the polymer of that layer consists essentially of a polyethylene having a density of at least 0.925 g/cm$^3$, a molecular weight distribution of no more than 4, optionally containing a fluoroelastomer, and methods for making such films.

Prior art document U.S. Pat. No. 6,223,945 discloses a container having a lightweight bottle body resistant to stress cracking, especially useful for liquid household products. The light weight of the body limits the amount of resources needed to produce the body. The body may include a multi-layer resin structure having an inner layer which includes a metallocene polyethylene polymer.

In another method, disclosed in co-pending patent application, high gloss plastic containers comprise an internal layer including a polyolefin and an external layer including a styrenic component containing from 40 to 85 wt % of styrene, based on the weight of the external layer.

There is thus a need for a method for efficiently producing plastic containers of very high gloss as well as good processability and mechanical properties.

An aim of the present invention is to produce plastic containers that offer simultaneously the desired glossy appearance and a good resistance to scratching.

It is also an aim of the present invention to obtain glossy plastic containers with good processability and good mechanical properties.

It is a further aim of the present invention to prepare plastic containers having a very high environmental stress crack resistance.

It is another aim of the present invention to produce plastic containers having a very high melt fracture onset.

It is yet another aim of the present invention to produce a resin that can be utilised in coextrusion.

The present invention provides multi-layer plastic containers, wherein the external layer or the internal layer consists essentially of a metallocene-produced medium density polyethylene (mMDPE) having a density of from 0.925 to 0.940 g/cm$^3$ and a melt index MI2 of from 0.5 to 2.5 g/10 min, said plastic containers having an environmental stress crack resistance (ESCR), as measured by the time to rupture, larger than 30 days and respectively, an external or internal gloss larger than 40.

In this specification, the density of the polyethylene is measured at 23° C. using the procedures of ASTM D 1505 and the gloss was measured following the method of standard test ASTM D 2457-90. The time to rupture is measured on containers filled up to 98% of their capacity with a 5% concentrated Antarox as deteriorating agent. They are placed under a load of 10 kg at 40° C. The time to rupture is recorded.

The melt index MI2 is measured using the procedures of ASTM D 1238 at 190° C. using a load of 2.16 kg. The high load melt index HLMI is measured using the procedures of ASTM D 1238 at 190° C. using a load of 21.6 kg.

Preferably, the density of the mMDPE is of from 0.930 to 0.940 g/cm$^3$.

The other layer(s) is(are) high density polyethylene(s) prepared with any one of the known catalysts, such as a chromium or a Ziegler-Natta or a metallocene catalyst, said metallocene catalyst being either the same as or different from the metallocene catalyst used to prepare the metallocene-produced external or internal layer.

According to a preferred embodiment of the present invention, the plastic containers are prepared by coextruding a metallocene-produced polyethylene resin and a high density polyethylene resin having a bimodal molecular weight distribution prepared with a Ziegler-Natta catalyst. The containers comprise from 10 to 30 wt % of the metallocene-produced polyethylene resin and from 90 to 70 wt % of the Ziegler-Natta high density polyethylene resin having a bimodal molecular weight distribution. The metallocene-produced resin can be used for the external layer if gloss is desired. Alternatively, it can be used for the internal layer. In addition, the on-line regrind made of bottle scraps is added to the HDPE layer(s).

According to another embodiment of the present invention, the plastic containers are prepared by coextruding a metallocene-produced polyethylene resin and a high density polyethylene resin having a monomodal molecular weight distribution prepared with a chromium catalyst.

A number of different catalyst systems have been disclosed for the manufacture of polyethylene, in particular medium-density polyethylene (MDPE) and high-density polyethylene (HDPE) suitable for blow moulding. It is known in the art that the physical properties, in particular the mechanical properties, of a polyethylene product vary depending on what catalytic system was employed to make the polyethylene. This is because different catalyst systems tend to yield different molecular weight distributions in the polyethylene produced It is known in the art to use chromium-based catalysts to polymerise HDPE and in particular to produce high-density polyethylene having high resistance to environmental stress cracking. For example, EP-A-0,291,824, EP-A-0,591,968 and U.S. Pat. No. 5,310,834 each disclose mixed catalyst compositions, incorporating chromium-based catalysts, for the polymerisation of polyethylene.

Alternatively, the HDPE can be produced using a conventional Ziegler-Natta catalyst or a supported Ziegler-Natta catalyst comprising metallocene sites such as described in EP-A-0,585,512 or in EP-A-0,580,930. The polymerisation is carried out in two liquid-full loop reactors in series at a temperature of from 50 to 120° C., preferably of from 60 to 110° C., under an absolute pressure of from 1 to 100 bar, in the presence of a catalyst consisting of a transition metal component (component A) that is the reaction product of an organoaluminium compound with a titanium compound, an organoaluminium compound (component B), and optionally one or more electron donor(s). The average molecular mass is regulated with hydrogen: this process comprises carrying the polymerisation such that the introduction of the comonomer, if any, is carried out essentially in the first reactor, such that the hydrogen concentration is very low in the first reactor in order to form ethylene polymers having a HLMI of from 0.01 to 5 g/10 min and such that a very high hydrogen pressure is maintained in the second reactor in order to form an ethylene polymer having a HLMI higher than 5 g/10 min.

The HDPE can further be polymerised with a metallocene catalyst capable of producing a mono- or bi- or multimodal distribution, either in a two step process such as described for example in EP-A-0,881,237, or as a dual or multiple site catalyst in a single reactor such as described for example in EP-A-0,619,325. Any metallocene catalyst known in the art can be used in the present invention. It is represented by the general formula:

$(Cp)_m MR_n X_q$ <span>I</span> wherein Cp is a cyclopentadienyl ring, M is a group 4b, 5b or 6b transition metal, R is a hydrocarbyl group or hydrocarboxy having from 1 to 20 carbon atoms, X is a halogen, and m-1-3, n=0-3, q=0-3 and the sum m+n+q is equal to the oxidation state of the metal.

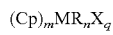
$(C_5R'_k)_g R''_s (C_5R'_k) MQ_{3-g}$ <span>II</span>

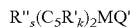
$R''_s (C_5R'_k)_2 MQ'$ <span>III</span> wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$-$C_6$ ring, R" is a $C_1$-$C_4$ alkylene radical, a dialkyl germanium or silicon or siloxane, or a alkyl phosphine or amine radical bridging two $(C_5R'_k)$ rings, Q is a hydrocarbyl radical such as aryl, alkyl, alkenyl, alkylaryl, or aryl alkyl radical having from 1-20 carbon atoms, hydrocarboxy radical having 1-20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1 and k is 5 when s is 0, and M is as defined above.

The metallocene may be supported according to any method known in the art. In the event it is supported, the support used in the present invention can be any organic or inorganic solids, particularly porous supports such as talc, inorganic oxides, and resinous support material such as polyolefin. Preferably, the support material is an inorganic oxide in its finely divided form.

An active site must be created by adding an activating agent having an ionising action.

Preferably, alumoxane is used as activating agent during the polymerization procedure, and any alumoxane known in the art is suitable.

The preferred alumoxanes comprise oligomeric linear and/or cyclic alkyl alumoxanes represented by the formula:

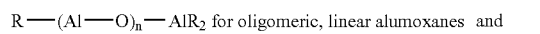
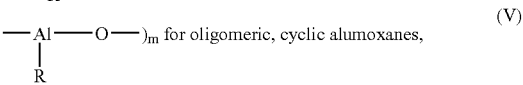

wherein n is 1-40, preferably 10-20, m is 3-40, preferably 3-20 and R is a $C_1$-$C_8$ alkyl group and preferably methyl.

Methylalumoxane is preferably used.

When alumoxane is not used as an activating agent, one or more aluminiumalkyl represented by the formula $AlR_x$ are used wherein each R is the same or different and is selected from halides or from alkoxy or alkyl groups having from 1 to 12 carbon atoms and x is from 1 to 3. Especially suitable aluminiumalkyl are trialkylaluminium, the most preferred being triisobutylaluminium (TIBAL).

The polymerisation of ethylene with the metallocene catalyst can be carried out in gas, solution or slurry phase. Preferably, the polymerization process is conducted under slurry phase polymerization conditions. The polymerisation temperature ranges from 20 to 125° C., preferably from 60 to 95° C. and the pressure ranges from 0.1 to 5.6 Mpa, preferably from 2 to 4 Mpa, for a time ranging from 10 minutes to 4 hours, preferably from 1 and 2.5 hours.

It is preferred that the polymerization reaction be run in a diluent at a temperature at which the polymer remains as a suspended solid in the diluent.

A continuous loop reactor is preferably used for conducting the polymerisation.

The average molecular weight is controlled by adding hydrogen during polymerisation. The relative amounts of hydrogen and olefin introduced into the polymerisation reactor are from 0.001 to 15 mole percent hydrogen and from 99.999 to 85 mole percent olefin based on total hydrogen and olefin present, preferably from 0.2 to 3 mole percent hydrogen and from 99.8 to 97 mole percent olefin.

The density of the polyethylene is regulated by the amount of comonomer injected into the reactor; examples of comonomer which can be used include 1-olefins butene, hexene, octene, 4-methyl-pentene, and the like, the most preferred being hexene. The melt index of polyethylene is regulated by the amount of hydrogen injected into the reactor.

The polyethylene resin used in the present invention can be prepared with either a single site metallocene catalyst or with a multiple site metallocene catalyst and it has therefore either a monomodal or a bimodal molecular weight distribution. The molecular weight distribution is of from 2 to 20, preferably, of from 2 to 7 and more preferably of from 2 to 5.

The external or internal layer of the plastic containers is prepared with a metallocene-produced medium density polyethylene (mMDPE). Among the preferred metallocene catalysts used to prepare said external or internal layer, one can cite ethylene bis-(tetrahydroindenyl) zirconium dichloride, ethylene bis-(indenyl) zirconium dichloride and bis-(n-butyl-cyclopentadienyl) zirconium dichloride as disclosed for example in WO 96/35729. The most preferred metallocene catalyst is ethylene bis-(tetrahydroindenyl) zirconium dichloride because it allows the largest selection of densities, molecular weights and melt flow indices.

The densities of the polyethylenes required for preparing the external or internal layer of the plastic containers of the present invention range from 0.925 g/cm³ to 0.940 g/cm³ and preferably, from 0.930 to 0.940 g/cm³. The melt indices useful in the present invention range from 0.5 g/10' to 2.5 g/10' and the molecular weight distribution is of from 2 to 7, preferabl from 2 to 5 and most preferably of less than 3.

The metallocene-produced medium density polyethylene resin (mMDPE) and the high density polyethylene resin (HDPE) are then coextruded to produce parisons that are blow-moulded into plastic containers having good physical and optical properties. In addition the containers of the present invention have a remarkable environmental stress crack resistance and are easy to process. They further have an excellent melt fracture onset in shear rate.

They are more preferably used for producing cosmetic packaging and household packaging such as detergent packaging of a capacity ranging from 0.01 to 20 litre.

The blow moulding machine, incorporating a coextrusion die for extruding a parison to be blow moulded, can be any one of the machines generally used for blow moulding. The following have been used for processing the polyethylene:
- a Battenfeld Fisher VK1-4 available from Battenfeld: this is a continuous extrusion or co-extrusion blow moulding machine with up to 6 extruders for the production of polyethylene bottles of 0.7 litre capacity, the bottles being either single layer or multi-layer with up to 6 layers;
- a high productivity wheel configuration machine with 6 cavities for continuous extrusion.

The plastic containers of the present invention are characterised by a very high gloss, as measured using the ASTM D 2457-90 test and an outstanding resistance to drop.

The drop resistance test is performed on 0.7-litre bottles prepared in accordance with the present invention.

The drop resistance is measured using the following procedure:
rejection of the test if the impact was equivocal or if the cap was leaky;
A. Preparation of the equipment and bottles:
the die and pin of the blow moulding equipment was cleaned on the day of production of the bottles;
the bottles had a fairly homogeneous thickness;
the net weight of bottles was 60 g;
the empty bottles were stored at room temperature for about 20 hrs;
the bottles were then filled with fluid, closed and brought to the desired conditioning as follows:
1) room temperature, water, 24+-3 hrs;
2) -18° C., water+anti-freeze, 24+-3 hrs;
B. A test run on a sample of 20 bottles included the following steps:
definition of the zero height;
selection of a starting height for the drop test;
selection of a homogeneous step distance in order to ensure the use of at least three different heights for each bottle tested;
recording of the result in a grid shown in Table 1;
modification of the height by subtracting or adding one step distance depending upon whether the bottle broke or not;

after 14 bottles were tested,
1) the test was interrupted if the number of ruptures N=7;
2) the test was continued until N=7, if N was <7;
3) the test was continued until the number of non-ruptures is 7, if N was >7
the calculation of the height of rupture HF was then given by the formula $$H_F = H_0 + [\Delta H(A/N - 0.5)]$$

wherein
$H_0$ is the minimum height,
$\Delta H$ is the step distance,
A is given by the product ($i*n_i$) wherein $n_i$ represents the number of ruptures at each height considering only the last 7 ruptures and i is an integer 0, 1, 2, ... indicating the number of steps above the minimum height $H_0$,
N is the total number of ruptures.

In all the tests performed either on the resins of the present invention or on the comparative resins, the bottles were dropped from a maximum height of 6.5 m. No ruptures occurred ($n_i=0$ and $i*n_i=0$).

It is possible to produce coextruded plastic containers wherein the external layer is a metallocene-produced polyethylene resin and the internal layer is a high density polyethylene resin with a bimodal molecular weight distribution produced with a Ziegler-Natta catalyst. The external layer represents from 10 to 30% by weight, preferably about 15% by weight, of the total weight of the container.

The typical weight of the container can be reduced by as much as 30 to 40% if so desired because of the excellent environmental stress crack resistance of the metallocene-produced resin.

Additionally and quite surprisingly, the production rate is very high even though the melt index is low.

EXAMPLES

Several plastic containers were prepared and tested for gloss, ESCR, stacking under load and melt fracture onset in shear rate. They were prepared with the following resins.

Resin R1 is a metallocene-produced medium density polyethylene resin. It was obtained by continuous polymerisation in a loop slurry reactor with a supported and ionised metallocene catalyst prepared in two steps by first reacting $SiO_2$ with MAO to produce $SiO_2.MAO$ and then reacting 94 wt % of the $SiO_2.MAO$ produced in the first step with 6 wt % of ethylene bis-(tetrahydroindenyl) zirconium dichloride. The dry catalyst was slurried in isobutane and pre-contacted with triisobutylaluminium (TIBAl, 10 wt % in hexane) before injection in the reactor. The reaction was conducted in a 70 l capacity loop reactor with the polymerisation temperature being maintained at 85° C. The operating conditions are as follows:
TIBAl: 120 cm³/h
IC4: 26 kg/h
C2: 9 kg/h
C6: 50 cm³/h
H2: 1.2 Nl/h.

Additionally, three high density density polyethylene resins prepared with a Ziegler-Natta catalyst have been used:
Resin R2 is Rigidex 4820 sold by BP Chemicals,
Resin R3 is DSV 10305.00 sold by Dow Plastics, and
Resin R4 is Finathene BM 593 produced by FINA Research S.A.

The characteristics of the four resins are summarised in Table I.

TABLE I

| Characteristics | R1 | R2 | R3 | R4 |
|---|---|---|---|---|
| HLMI g/10 min | 25 | 52 | 49 | 26 |
| MI2 g/10 min | 0.85 | 1.70 | 1.00 | 0.27 |
| Density g/cm³ | 0.934 | 0.950 | 0.953 | 0.959 |
| Bell ESCR F50 h | >1000 | <24 | 43 | 250 |
| GPC | | | | |
| Mn | 34083 | 19160 | 17690 | 12717 |
| Mw | 88134 | 102896 | 125473 | 170284 |
| D | 2.6 | 5.4 | 7.1 | 13.4 |

The Bell ESCR was measured following the method of standard test ASTM D 1690 and the HLMI was measured following the method of standard test ASTM 1238 at 190° C. and under a load of 21.6 kg.

These resins were coextruded with the VK-14 Battenfeld extruder to prepare seven two-layer 700 ml bottles of different compositions. The inner and outer layer compositions and proportions are as described in Table II as well as the bottles characteristics. About 30 wt % of bottle scraps were incorporated in the inner layer of all the bottles. The bottle height was 213 mm for all samples.

The machine operating conditions were as follows. The machine output: is of about 15 kg/h and the mass temperature is of from 170 to 215° C.

The die gap is progressively reduced by 100 steps in the machine setting, while keeping a constant output. The shear rate for melt fracture onset is recorded and the trial is stopped at that position.

The swell in weight (50 cm parison length) is recorded at positions 500 and 1000 of the die gap.

TABLE II

| | Bottle | | | | | | |
|---|---|---|---|---|---|---|---|
| | B1 | B2 | B3 | B4 | B5 | B6 | B7 |
| Inner layer Resin | R4 | R4 | R4 | R4 | R4 | R4 | R4 |
| Inner layer thickness % | 70 | 70 | 70 | 70 | 85 | 85 | 85 |
| Outer layer resin | R2 | R1 | R1 | R1 | R1 | R1 | R1 |
| Outer layer thickness % | 30 | 30 | 30 | 30 | 15 | 15 | 15 |
| Mass temp. ° C. | 213 | 208 | 210 | 210 | 210 | 211 | 209 |
| Bottle thickness mm | 0.7 | 0.7 | 0.85 | 1.0 | 0.7 | 0.85 | 1 |
| Bottle weight g | 41.2 | 38 | 47 | 54 | 38 | 47 | 54 |

The gloss was measured at an angle of 60° using the method of standard test ASTM D 2457-90.

The environmental stress crack resistance was measured on bottles filled up to 98% of their capacity with a 5% concentrated Antarox as deteriorating agent. They were then placed under a load of 10 kg at 40° C. The test has now been prolonged for 10 weeks without showing any signs of rupture for all the bottles prepared according to the present invention.

The bottle deflection was measured after 48 hours of testing under the load of 10 kg at 40° C.

The swell in weight of the plastic containers prepared according to the present invention has been reduced by 5% with respect to mono-layer containers made of resin R4.

The results are displayed in Table III.

TABLE III

| | Bottle | | | | | | |
|---|---|---|---|---|---|---|---|
| | B1 | B2 | B3 | B4 | B5 | B6 | B7 |
| Melt fracture onset s-1 | 1074 | 9500 | 9500 | 9500 | 9500 | 9500 | 9500 |
| Ext. gloss % | 58 | 90 | 90 | 90 | 90 | 90 | 90 |
| Time to rupture Days | 6.6 | ≧400 | ≧400 | ≧400 | ≧250 | ≧250 | ≧250 |
| Initial bottle height mm | 213 | 213 | 213 | 213 | 213 | 213 | 213 |
| Bottle deflection Mm | 8 | 13.6 | 8.8 | 6.8 | 11.8 | 8.8 | 6.2 |

Two 200 ml bottles were coextruded on a continuous five cavities machine with the following compositions:

Bottle B8 was coextruded at a mass temperature of 170° C.: it comprised a 70 wt % inner layer prepared from the Dow 35060 E HDPE resin produced with a Ziegler-Natta catalyst and having a bimodal molecular weight distribution and a 30 wt % outer layer prepared from the Dow DSV 10305.00 HDPE resin R3;

Bottle B9 was coextruded at a mass temperature of 170° C. with a 80 wt % inner layer prepared layer prepared from the Dow 35060 E HDPE resin and a 20 wt % outer layer prepared from the metallocene-produced MDPE resin R1.

These bottles were tested for melt fracture onset and external gloss. The results are displayed in table IV.

TABLE IV

| | Bottle | |
|---|---|---|
| | B8 | B9 |
| Main temp. ° C. | 170 | 170 |
| Melt fracture onset s-1 | 1500 | None |
| External gloss % | 37 | 87 |

These examples clearly show that when the external layer of plastic containers is prepared from a metallocene-produced medium density polyethylene, the final product has an excellent processability as the metallocene resin is very little sensitive to melt fracture. They also have a very high external gloss and a highly improved environmental stress crack resistance. Structures having a very high ESCR potential can be prepared with a reduced weight either with thinner walls or a higher density grade in the inner layer.

In addition, in most coextruded structures available on the market the inner layer represents typically 70% of the total wall thickness whereas the outer layer represents the remaining 30%. The examples according to the present invention show that when the outer layer is made of a metallocene-produced medium density polyethylene an 85/15 coextruded composition has outstanding properties.

Coloured multilayer bottles have been produced wherein the external layer is prepared with a mPE and has a thickness of from 5 to 30% of the total wall thickness. Because of the excellent transparency of the external layer, it is not necessary to add colorant to the external layer: the internal alone needs to be coloured. There was no visible difference between the bottles produced with and without colorant in the external mPE layer. Special aesthetic effects can thus be produced The containers produced according to the present invention are suitable for use in the cosmetic and detergent packaging.

The invention claimed is:

1. A multilayer plastic container having a wall structure comprising at least two layers, wherein one of said layers is configured to provide an internal layer having a internal wall surface and the other said layer is configured to provide an external layer having an external wall surface, one of said layers consisting essentially of a metallocene-produced medium density polyethylene (mMDPE) resin having a density within the range of 0.925-0.94 g/cm$^3$ and a melt index, MI2, within the range of 0.5-2.5 g/10 min. and representing from 10-30 wt. % of the total weight of said plastic container, and the other said layers prepared from a high density polyethylene (HDPE) resin, said plastic container having an internal or external surface having a gloss of at least 40 as provided by the layer of medium density polyethylene and having an environmental stress crack resistance as measured by the time to rupture of at least 30 days.

2. A multilayer plastic container according to claim 1 wherein the density of said metallocene-produced medium density polyethylene is within the range of 0.93-0.94 g/cm$^3$.

3. A multilayer plastic container according to claim 1 wherein the metallocene-produced medium density polyethylene has a molecular weight distribution within the range of 2-20.

4. A multilayer plastic container according to claim 3 wherein the metallocene-produced medium density polyethylene has a molecular weight distribution within the range of 2-7.

5. A multilayer plastic container according to claim 4 wherein the metallocene-produced medium density polyethylene has a molecular weight distribution within the range of 2-5.

6. A multilayer plastic container according to claim 5 wherein said metallocene-produced medium density polyethylene has a molecular weight distribution of less than 3.

7. The multilayer plastic container of claim 1 wherein said high density polyethylene has a multimodal molecular weight distribution.

8. A multilayer plastic container according to claim 1 wherein said high density polyethylene resin is prepared by a metallocene catalyst, which may be the same as or different from the metallocene catalyst used to produce the medium density polyethylene.

9. A multilayer plastic container according to claim 1 wherein said wall structure comprises an external layer formed of said metallocene-produced medium density polyethylene resin wherein the external surface of said wall structure has a gloss of at least 40.

10. A multilayer plastic container according to claim 9 wherein said external layer represents about 15% by weight of the total weight of said container.

11. A multilayer plastic container according to claim 1 consisting of two layers wherein the external layer is formed of a metallocene-produced medium density polyethylene and the internal layer is formed of a high density polyethylene having a multimodal molecular weight distribution prepared with a Ziegler-Natta catalyst system.

12. A multilayer plastic container according to claim 1 consisting of two layers wherein the external layer is formed of a metallocene-produced medium density polyethylene and the internal layer is formed of a high density polyethylene having a monomodal molecular weight distribution prepared with a chromium catalyst system.

13. A multilayer plastic container according to claim 1 that is produced by blow molding a coextruded parison comprising one layer of said medium density polyethylene and another layer of said high density polyethylene.

14. A multilayer plastic container according to claim 1 comprising a colored multilayer bottle wherein the external layer is formed of a metallocene-produced medium density polyethylene providing a transparent external layer and a colored internal layer.

* * * * *

UNITED STATES PATENT AND TRADEMARK OFFICE
CERTIFICATE OF CORRECTION

PATENT NO. : 7,514,130 B2  
APPLICATION NO. : 10/491697  
DATED : April 7, 2009  
INVENTOR(S) : Eric Maziers Page 1 of 1

It is certified that error appears in the above-identified patent and that said Letters Patent is hereby corrected as shown below:

On the title page item (73) Assignee:

"Fina Technology, Inc., Houston, TX (US)" should read --Total Petrochemicals Research Feluy, Feluy, Belgium--.

On the title page item (74) Attorney, Agent, or Firm:

"Tenlev" should read --Tenley--.

On the title page item (57) Abstract:

"Plastic containers including two or more layers wherein the external or the internal layer formed of of metallocene-produced medium density polyethylene resin, said plastic container respectively an external or internal gloss of at least 40 and an environmental stress crack resistance, as measured by the time to rupture of at least 30 days." should read --Plastic containers including two or more layers wherein the external or the internal layer formed of metallocene-produced medium density polyethylene resin, said plastic container respectively an external or internal gloss of at least 40 and an environmental stress crack resistance, as measured by the time to rupture of at least 30 days.--.

Signed and Sealed this

Seventh Day of September, 2010

David J. Kappos  
*Director of the United States Patent and Trademark Office*